United States Patent
Nguyen et al.

(10) Patent No.: US 7,094,024 B2
(45) Date of Patent: Aug. 22, 2006

(54) PERFORMANCE AND DURABILITY IMPROVEMENT IN COMPRESSOR STRUCTURE DESIGN

(75) Inventors: Ly D. Nguyen, Phoenix, AZ (US); Lori M. Wheeler, Scottsdale, AZ (US); Greg Ockenfels, Phoenix, AZ (US); Darrell K. James, Chandler, AZ (US); George E. Zurmehly, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 133 days.

(21) Appl. No.: 10/759,928

(22) Filed: Jan. 15, 2004

(65) Prior Publication Data

US 2005/0158173 A1  Jul. 21, 2005

(51) Int. Cl.
*F04D 29/44* (2006.01)
(52) U.S. Cl. ............... 415/185; 415/204; 29/888.02
(58) Field of Classification Search ............ 415/184, 415/185, 189, 190, 203, 204, 213.1, 220; 29/888.02, 889.2, 889.22
See application file for complete search history.

(56) References Cited

U.S. PATENT DOCUMENTS 4,981,018 A * 1/1991 Jones et al. .................. 60/726
6,513,330 B1   2/2003 Rice et al.

OTHER PUBLICATIONS

U.S. Appl. No. 10/666,611, filed Sep. 17, 2003, Nguyen et al.

* cited by examiner

*Primary Examiner*—Edward K. Look
*Assistant Examiner*—Dwayne J White
(74) *Attorney, Agent, or Firm*—Ingrassia Fisher & Lorenz

(57) ABSTRACT

An integral assembly that may improve control over thermal and mechanical behaviors of assembly structures during various transient operation conditions is disclosed. The integral assembly comprises a continuous ring disposed coaxial with, and orthogonal to a central axis, the continuous ring comprising a plurality of surfaces, the plurality of surfaces having a continuous outer surface and a continuous inner surface; the plurality of surfaces being characterized by a continuous cross section having a first cross sectional dimension longitudinally disposed parallel to the central axis; the plurality of surfaces comprising a bell mouth surface in physical communication with a compressor shroud surface; the compressor shroud surface being in physical communication with a diffuser surface; and the diffuser surface being in physical communication with the bell mouth surface. The integral assembly comprising a compressor shroud is also provided. An auxiliary power unit including the integral assembly, and a method of making the integral assembly are also disclosed.

24 Claims, 8 Drawing Sheets

PERFORMANCE AND DURABILITY IMPROVEMENT IN COMPRESSOR STRUCTURE DESIGN

GOVERNMENT RIGHTS

This invention was made with Government support under contract number N00019-01-C-3002 awarded by the United States Government under the JSF program to Lockheed Martin. The Government has certain rights in this invention.

BACKGROUND OF THE INVENTION

The present invention generally relates to apparatus and method of an integral gas turbine assembly. More specifically, the present invention relates to apparatus and methods relating to an assembly comprising an integral bell mouth, impeller shroud and diffuser.

Gas turbine engine aircraft may utilize an auxiliary power unit (APU) for a variety of tasks under a variety of conditions. An APU may include various modules, for example, a cooling module, a generator module, a compressor module, and a combustion module, that may each perform different functions.

During operation of a conventional APU, air may enter a compressor module where it may pass through a compressor wheel rotating between an impeller shroud and a housing. The air may then be accelerated by the compressor wheel outwards at an increased speed towards a diffuser. The diffuser, which may include a ring of static vanes, may then function to slow the accelerated air down for other uses.

Accordingly, a conventional compressor module may include multiple static components which create cavities, and assemblies that various rotational components of the compressor module may function in. Examples of conventional static components may include an air inlet, a bell mouth against which incoming air may impinge, an impeller shroud about which blades of a compressor wheel may rotate, and a diffuser.

When an aircraft is not in flight, an APU may operate in an open loop configuration, wherein a gas turbine may be fired to produce power required to operate various systems on the aircraft. When the aircraft is engaged in flight, the APU may transition to a closed-loop operational mode, which may utilize main propulsion engine bleed air for power. These two modes of operation may have different operational parameters, such as the operational temperature of the various components and the temperature of the incoming air. Differences in operational parameters between these two modes of operation may require different clearance controls between rotating groups and static structures for the APU to operate efficiently.

However, a conventional multiple component compressor module may include various separate components which may be arranged into various separate assemblies. As such, thermal and mechanical loading differences which may be brought about during transient conditions, may exist between the various separate components of a conventional compressor module. Such differences in the components may not allow for accurate prediction of structural behaviors of the various components of a conventional multiple component system during transient conditions that may include a transition from open loop operation to closed loop operation, or the reverse. Since accurate prediction of structural behaviors may be difficult if not impossible to predict, enhancing performance and durability of a conventional multiple component compressor module by controlling parameters that depend on such structural behaviors may be difficult.

For example, enhancing performance of an APU may be accomplished by more uniformly controlling a thermal response on a compressor shroud in combination with a diffuser. However, changes in thermal response as may be experienced during a transition from open loop operation, to a relatively hotter condition brought about by closed loop operation, may result in an inability to control such a thermal response in a multiple component compressor module. An inability to control such a thermal response may be due, in part, to a lack of thermal communication between a compressor shroud and a bell mouth. Partial control over thermal response may be obtained by adding additional components to the compressor module, such as, a grid over an inlet that may uniformly distribute airflow at the inlet. A conventional multiple component compressor module may also require a variety of fasteners, braces, and the like to maintain structural integrity of the module. However, such additional components may be undesirable because they may add weight, cost, and complexity to the system, thus may not provide for a robust system.

In addition, tighter clearances between various components of a conventional multiple component compressor module which may enhance performance of a compressor, may be prevented due to limitations in manufacturing methods, and/or by the cumulative build up of the tolerances among the various components of a conventional multiple component compressor module, and/or other modules and components. Furthermore, the multiple component approach of the prior art may create undesirable leak paths between various components arranged within a conventional multiple component compressor module.

As can be seen, there is a need for a compressor module assembly which may allow for a more accurate prediction of structural behaviors of the various components due to thermal and mechanical loading during transient conditions. There is also a need for a compressor module assembly which may be produced with existing manufacturing tolerance capabilities that may improve the efficiency of the compressor module by, for example, enhancing flow on a higher flow momentum from a compressor edge blade into a diffuser, while maintaining current manufacturing techniques. In addition, there is a need for a compressor module assembly which may prevent, or minimize, leak paths between various components. There is also a need for a compressor module assembly which does not require a plurality of fasteners and/or other support members that may add mass to the unit.

SUMMARY OF THE INVENTION

In one aspect of the present invention, an integral assembly comprises a continuous ring disposed coaxial with, and orthogonal to a central axis, the continuous ring comprising a plurality of surfaces, the plurality of surfaces having a continuous outer surface; the plurality of surfaces comprising a bell mouth surface in physical communication with a compressor shroud surface; the compressor shroud surface being in physical communication with a diffuser surface; and the diffuser surface being in physical communication with the bell mouth surface.

In another aspect of the present invention, an integral assembly comprises a continuous ring disposed coaxial with, and orthogonal to, a central axis; the continuous ring comprising a plurality of contiguous surfaces; the plurality of contiguous surfaces having a continuous outer surface characterized by a continuous cross-section longitudinally disposed parallel to the central axis; the plurality of contiguous surfaces comprising a bell mouth surface in physical communication with a compressor shroud surface, the compressor shroud surface in physical communication with a diffuser surface; the diffuser surface in physical communication with the bell mouth surface; the diffuser surface having a diffuser face on a portion of the continuous outer surface radially disposed about the central axis; the diffuser face being perpendicular to the central axis; the diffuser face comprising a plurality of vanes extending longitudinally away from the diffuser face in a direction of the central axis; the integral assembly further including a compressor shroud comprising a compressor shroud ring having a first side separated from a second side; and the first side of the compressor shroud ring being in physical communication with one or more of the vanes.

In still another aspect of the present invention, an integral assembly comprises a continuous ring disposed coaxial with, and orthogonal to, a central axis; the continuous ring comprising a plurality of contiguous surfaces; the continuous ring having a plurality of mounting holes arranged annularly at an outer portion of the continuous ring; the plurality of contiguous surfaces having a continuous outer surface characterized by a continuous cross-section longitudinally disposed parallel to the central axis; the plurality of contiguous surfaces comprising a bell mouth surface in physical communication with a compressor shroud surface, the compressor shroud surface in physical communication with a diffuser surface; the diffuser surface in physical communication with the bell mouth surface; the bell mouth surface comprising a curved scalloped shaped portion arranged between the diffuser surface and the compressor shroud surface; the diffuser surface having a diffuser face on a portion of the continuous outer surface radially disposed about the central axis; the diffuser face being perpendicular to the central axis; the diffuser face comprising a plurality of vanes extending longitudinally away from the diffuser face in a direction of the central axis; the plurality of vanes each including a top surface that is parallel to the diffuser face, the integral assembly further including a compressor shroud comprising a compressor shroud ring having a first side separated from a second side; and the first side of the compressor shroud ring being in physical communication with each of the top surfaces of the plurality of vanes such that the first side of the compressor shroud ring is arranged parallel to the diffuser face.

In still another aspect of the present invention, an auxiliary power unit comprises a compressor module; the compressor module comprising an inlet in fluid communication with a bell mouth surface and with a compressor wheel; the compressor wheel being able to rotate along a central axis between a compressor housing and a compressor shroud surface; the compressor wheel having a trailing edge in fluid communication with a leading edge of a diffuser surface; wherein the bell mouth surface, the compressor shroud surface, and the diffuser surface comprise an integral assembly; the integral assembly comprising a continuous ring disposed coaxial with, and orthogonal to, the central axis; the continuous ring comprising a plurality of surfaces, the plurality of surfaces having a continuous outer surface and a continuous inner surface characterized by a continuous cross section having a first cross sectional dimension longitudinally disposed parallel to the central axis; the plurality of surfaces comprising the bell mouth surface in physical communication with the compressor shroud surface; the compressor shroud surface being in physical communication with the diffuser surface; and the diffuser surface being in physical communication with the bell mouth surface.

In still another aspect of the present invention, a method of making an integral assembly, comprises forming a first sub-assembly having a first end and a second end; forming a second sub-assembly having a first end and a second end; attaching the first end of the first sub-assembly to the first end of the second sub assembly; and attaching the second end of the first sub-assembly to the second end of the second sub-assembly, to produce the integral assembly, wherein the integral assembly comprises a continuous ring disposed coaxial with, and orthogonal to, a central axis; the continuous ring comprising a plurality of surfaces, the plurality of surfaces having a continuous outer surface and a continuous inner surface; the plurality of surfaces being characterized by a continuous cross section having a first cross sectional dimension longitudinally disposed parallel to the central axis; the plurality of surfaces comprising a bell mouth surface in physical communication with a compressor shroud surface, the compressor shroud surface being in physical communication with a diffuser surface; and the diffuser surface being in physical communication with the bell mouth surface.

These and other features, aspects and advantages of the present invention will become better understood with reference to the following drawings, description and claims.

DETAILED DESCRIPTION OF THE INVENTION

Figure 1:
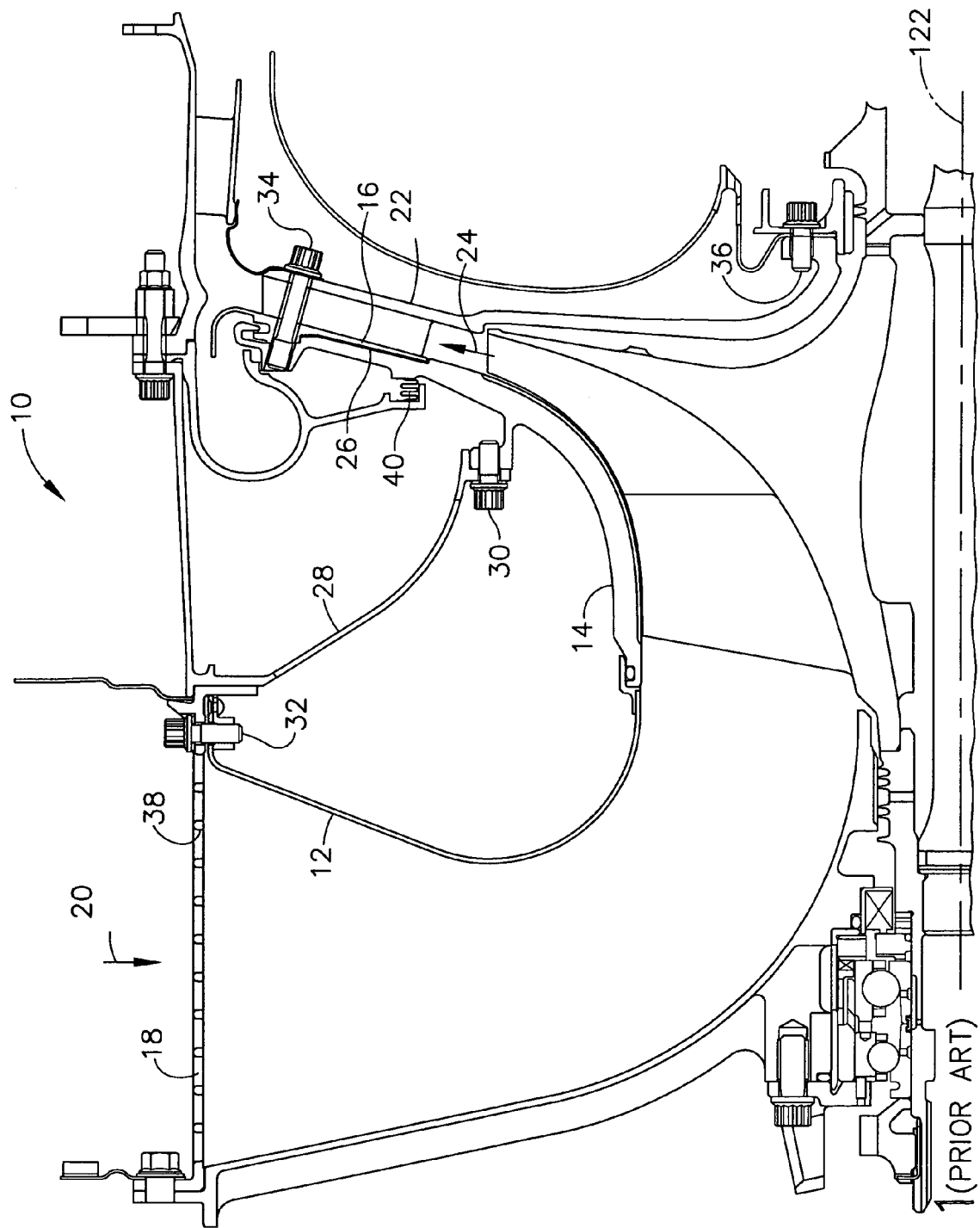
FIG. 1 is a sectional view of a multiple component compressor module of the prior art.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides an integral gas turbine assembly which may be used, for example, in an auxiliary power unit (an "APU") of an aircraft. The integral assembly may comprise a bell mouth, an impeller shroud, and a diffuser, in one contiguous surface. Accordingly, the integral assembly may thus comprise a bell mouth surface in physical communication with a compressor shroud surface, and the compressor shroud surface may be in physical communication with a diffuser surface; wherein the diffuser surface may be in physical communication with the bell mouth surface. This is in contrast to apparatus of the prior art, which may use multiple separate components, such as a separate bell mouth, a separate impeller shroud, a separate diffuser, and a separate compressor shroud.

The present invention may also provide for improvement in control over a thermal response on a compressor shroud as may occur when an APU is transitioned to different operational configurations, e.g., during a transition from open loop operation to closed loop operation. The present invention may provide such improvement in control over a thermal response by an improved thermal communication that may exist between an integral bell mouth and a diffuser, both of which may be in physical communication (e.g., physical contact) with a compressor shroud. Thus, the integral gas turbine assembly of the present invention may facilitate improved thermal communication between various surfaces of the present invention. This is unlike the prior art, wherein control over changes in thermal response, such as those that may be experienced during a transition from open loop operation to closed loop operation, may not be allowed for, in part, due to the lack of thermal communication and/or synchronization between a compressor shroud and a separate bell mouth.

Also, the present invention may include an assembly including a compressor shroud that does not impact the durability of a compressor module in which the present invention may be operated. The present invention may achieve an improvement in durability by including a compressor shroud directly attached to machined vanes of a diffuser to form an integral component. This is in contrast to the prior art, wherein a compressor shroud may be a separate component held in place using a fastener, and which may not be attached to diffuser vanes. This integral component of the present invention may provide better flow transition from the compressor to the diffuser, may control radial and axial gap at the critical transition location, may maximize flow area by controlling smaller root radius on the higher mach number side and thus may improve engine performance.

The present invention may also include a plurality of surfaces that may be machined as a single unit and which may be machined in a single manufacturing step, thus allowing for control and implementation of optimal tolerances and clearances between various portions of the assembly, and along flow paths known to affect turbine efficiency. This is unlike the prior art, wherein optimal tolerances between various components and along flow paths may not be achievable due to a cumulative effect that inherent variations, e.g., variations brought about by current manufacturing practices, may have on tolerances of an assembly produced from multiple components.

FIG. 1 depicts a sectional view of a multiple component compressor module of the prior art, which may be a module in, for example, an APU. The prior art compressor module shown in FIG. 1 is referred to generally as 10, which is shown divided along a center line 122. As shown in this multiple component prior art apparatus represented in FIG. 1, the multiple component compressor module 10 may have various separate components forming a partial bell mouth 12 at an inlet 18, a separate compressor shroud 14, and a separate diffuser 16.

In particular, a multiple component approach, e.g., as shown in FIG. 1, may prevent enhanced engine performance which may be gained by controlling an alignment of a flow path 24 between a compressor back shroud 22, compressor shroud 14 and diffuser 16. An inability to control such alignments may be due to limitations of precision that may be obtained within manufacturing tolerances of separate components, such as diffuser 16, and compressor back shroud 22 of FIG. 1. Such a situation may occur when the level of control over component spacing within an assembly, that may be required to realize an improvement in engine performance, may be less than the cumulative tolerances of the individual components of that assembly.

Furthermore, the multiple component approach of the prior art, for example, as shown in the multiple component compressor module 10, may create leak paths, for example, a leak path 26, which may be between a seal 40 disposed between various components arranged within multiple component compressor module 10. In addition, such a multiple component approach as shown in prior art FIG. 1 may require various support arms 28, and may require a plurality of fasteners 30, 32, 34, and 36, to provide attachment of, and physical communication between, the various components which comprise multiple component compressor module 10. Such added support arms 28, and fasteners 30, 32, 34 and 36, may not allow a multiple component approach to meet a weight requirement such as may be demanded by design considerations of, for example, a fighter jet.

In addition, compressor back shroud 22 which may be held in place by a fastener, for example fastener 36, as may be required by such a multiple component compressor module 10, may be susceptible to vibration and thus limit the durability of the multiple component compressor module 10.

Figure 2:
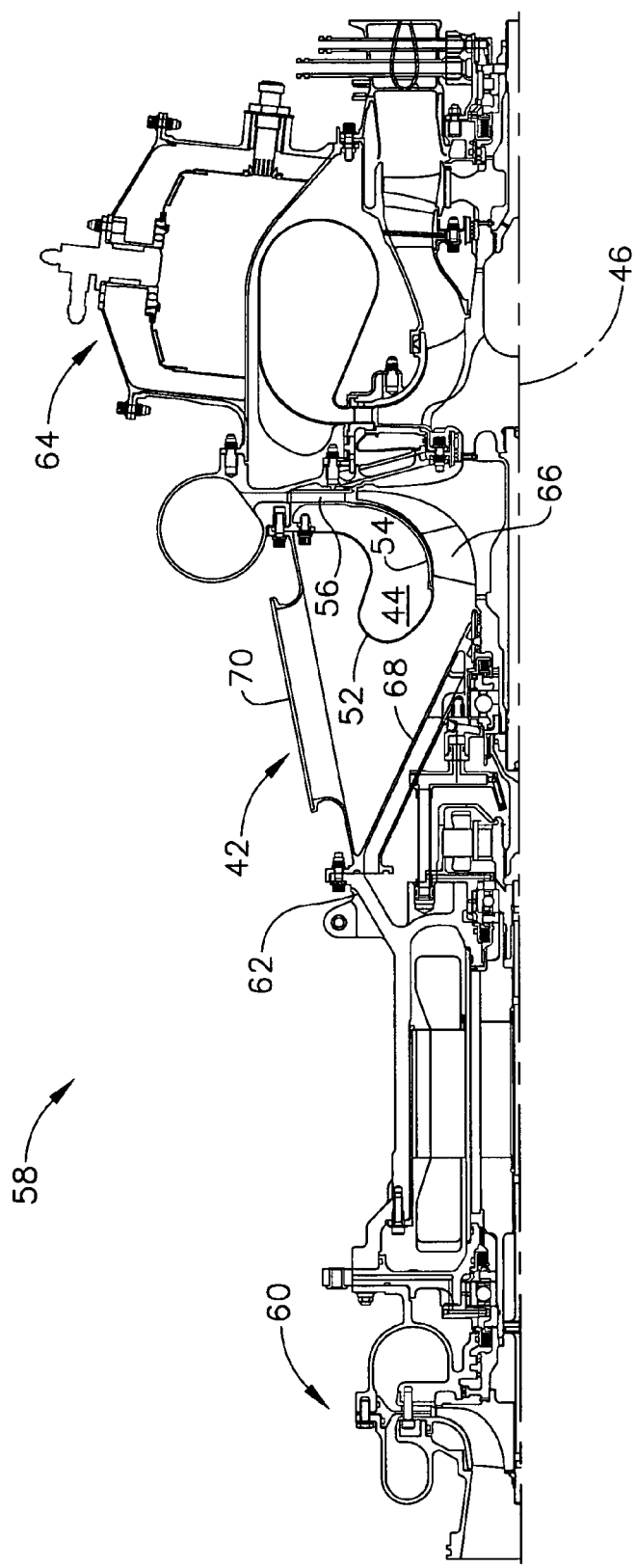
FIG. 2 is a sectional view of an auxiliary power unit comprising an integral assembly, according to one embodiment of the present invention.

In more specifically describing the present invention, FIG. 2 shows a sectional view of an APU 58 that includes the integral assembly, generally referred to as 44, of the present invention. APU 58 may include a cooling turbine 60, a generator housing 62, a compressor module 42, and a combustor module 64. APU 58 is shown divided along a central axis 46. Within compressor module 42, inlet 70 may be in fluid communication with a bell mouth surface 52, with a compressor wheel 66, with a compressor shroud surface 54, and with a diffuser surface 56. Compressor wheel 66 may rotate along central axis 46 between a compressor housing 68, and compressor shroud surface 54 of integral assembly 44 of the present invention. The bell mouth surface 52 of integral assembly 44 may be located below, and in fluid communication with, an inlet 70 of compressor module 42. The diffuser surface 56 of the integral assembly 44 of the present invention may be in physical communication, and may be in thermal communication with, both compressor shroud surface 54 and bell mouth surface 52 of the integral assembly 44.

In one embodiment, bell mouth surface 52, compressor shroud surface 54, and diffuser surface 56 may form one contiguous surface. Other surfaces and/or assemblies of the present invention may also be contiguous with each other, as is shown in commonly assigned, co-pending U.S. patent application Ser. No. 10/666,611, filed on the 17 of Sep., 2003 (entitled, Integral Compressor Housing of Gas Turbine Engines), the disclosure of which is incorporated by reference herein in its entirety.

Figure 3:
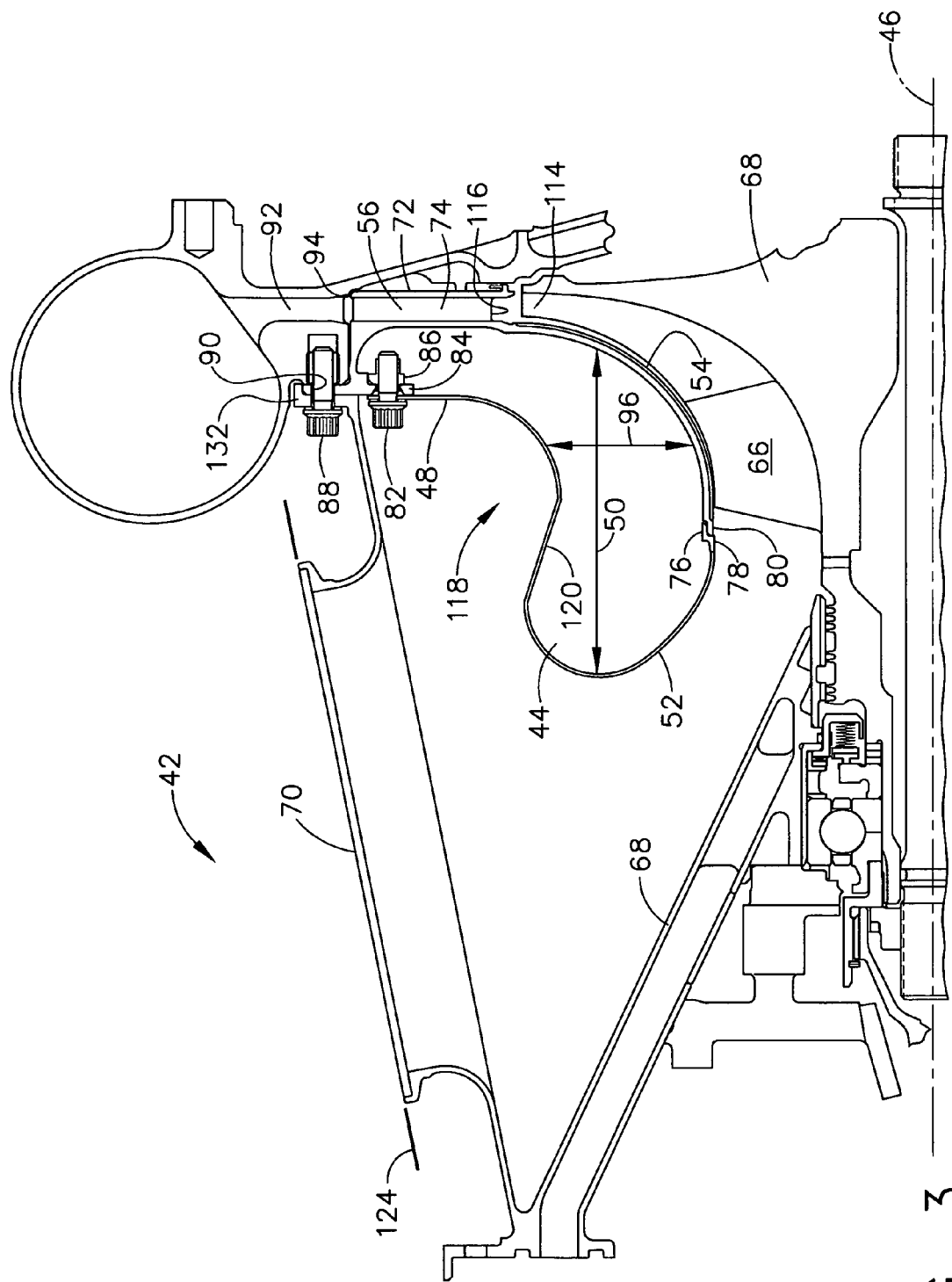
FIG. 3 is a sectional view of a compressor module shown in FIG. 2, that includes an embodiment of the integral assembly of the present invention.

FIG. 3 shows an expanded sectional view of compressor module 42 (see FIG. 2) that includes integral assembly 44 of the present invention. In one embodiment, integral assembly 44 of the present invention may include a plurality of surfaces contiguous with each other. The plurality of contiguous surfaces may be in physical communication with, and/or physically attached to, each other such that the plurality of surfaces form a continuous ring 94 disposed radially about a central axis 46. Continuous ring 94 may thus be disposed coaxially with, and orthogonal to, central axis 46. The plurality of attached surfaces of integral assembly 44 may have a continuous outer surface 48, separated from a continuous inner surface 120. As such, the plurality of surfaces of integral assembly 44 may be characterized by a continuous cross-section having a plurality of dimensions in a plurality of different directions.

The continuous cross section may have one or more of a first cross sectional dimension 50 that may be longitudinally disposed parallel to central axis 46. The continuous cross section may also have one or more of a second cross sectional dimension 96 that may be orthogonal to, and radially disposed about, central axis 46, as well as a plurality of cross sectional dimensions (See cross sectional dimensions 126 and 128 of FIG. 4A) disposed at various angles to central axis 46. As shown in FIG. 2, the continuous cross-section need not be regular or symmetrical in shape, but may be continuous in that each of the plurality of surfaces of which integral assembly 44 may be comprised, may be in physical contact with at least two other surfaces of the plurality of surfaces thus forming one contiguous surface.

In an embodiment of the present invention, the plurality of surfaces of integral assembly 44 may include bell mouth surface 52, which may be in physical communication with compressor shroud surface 54. Compressor shroud surface 54 may be in physical communication with diffuser surface 56. Diffuser surface 56 may be in physical communication with bell mouth surface 52. Continuous outer surface 48 of integral assembly 44 may comprise bell mouth surface 52, compressor shroud surface 54, and diffuser surface 56. Accordingly, continuous outer surface 48 of integral assembly 44 may reduce, or eliminate, leak paths between inlet 70 and compressor outlet 92.

Bell mouth surface 52 may be physically attached to compressor shroud surface 54 at a first end 78 of bell mouth surface 52 and at a first end 80 of compressor shroud surface 54. Physical attachment between bell mouth surface 52 and compressor shroud surface 54 may be obtained through a lap joint 76, and/or the ends may be brazed (not shown), welded, press fit (not shown), or the like, to provide mechanical communication between the two surfaces. In another embodiment, bell mouth surface 52 may be physically attached to diffuser surface 56 at a second end 84 of bell mouth surface 52 and at a first end 86 of diffuser surface 56 using a first mechanical fastener 82, and/or by brazing (not shown), welding (not shown), or otherwise joining the two surfaces together to provide mechanical communication therebetween.

In another embodiment of the present invention, bell mouth surface 52 may include a curved scalloped portion 118, which may include a curved portion that may be concave in shape to a plane 124 which includes inlet 70. Curved scalloped portion 118 of bell mouth surface 52 may be arranged between diffuser surface 56, and compressor shroud surface 54. Furthermore, bell mouth surface inner slots 143 may be included in the design to allow the pressure to communicate between the inlet 70 and the cavity between the bell mount 52 and the diffuser shroud 54.

Integral assembly 44 may be attached to compressor housing 68 using a second mechanical fastener 88, which may be disposed through at least one of a plurality of mounting holes 90 arranged annularly at an outer portion 132 of continuous ring 94 of integral assembly 44.

In another embodiment, integral assembly 44 may include a compressor shroud surface 54 and a diffuser surface 56 formed from a single piece of material 134 (see FIG. 5A), such as by being machined from a single plate.

Figure 4A:
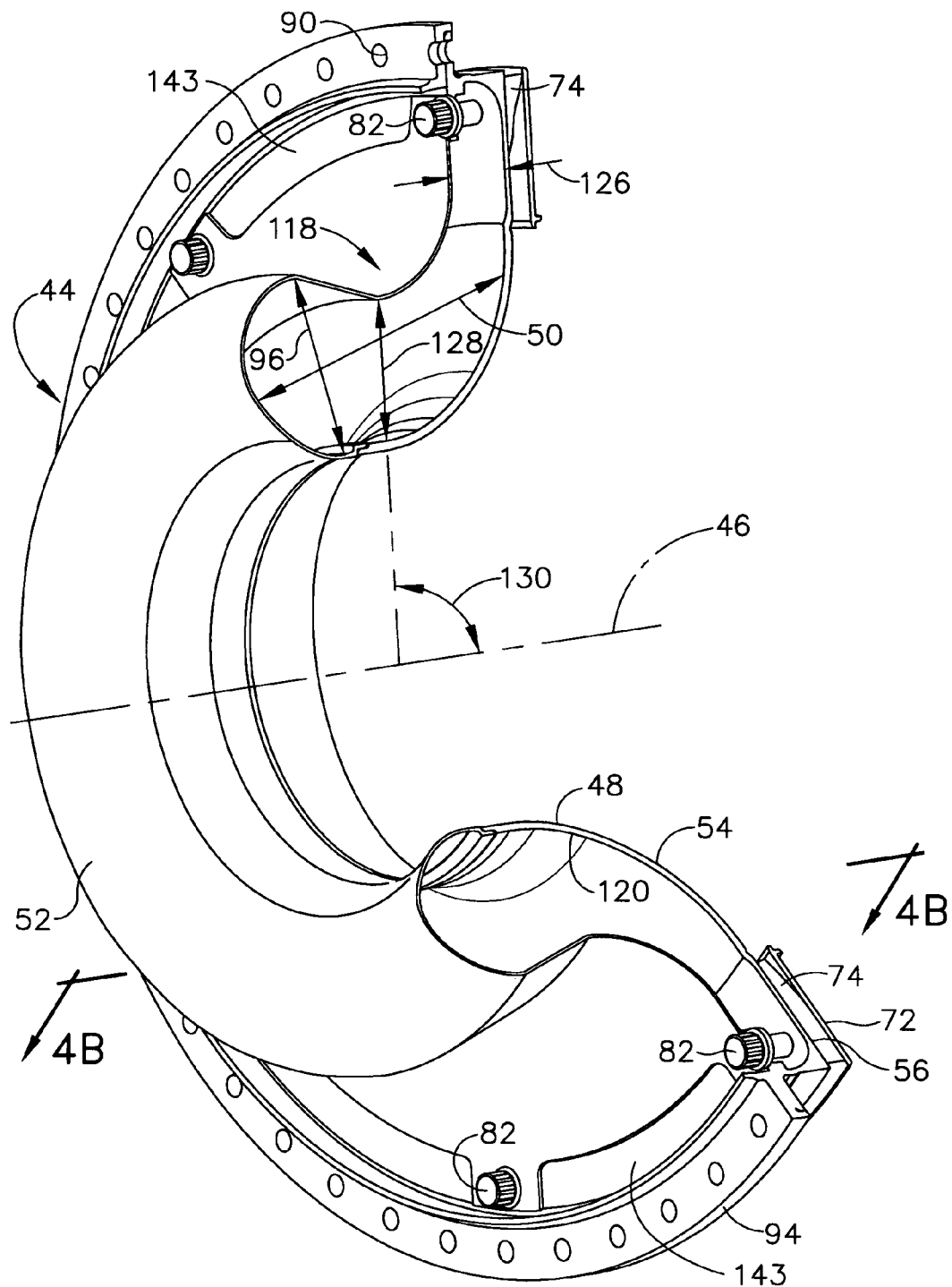
FIG. 4A is a side perspective view of the integral assembly of the present invention with a compressor shroud.

As shown in FIG. 4A, an embodiment of integral assembly 44 of the present invention, may comprise a continuous ring 94 disposed coaxial with, and orthogonal to, central axis 46. Continuous ring 94 may include a continuous outer surface 48, which may comprise bell mouth surface 52. Bell mouth surface 52 may be physically attached to compressor shroud surface 54. Compressor shroud surface 54 may be physically attached to diffuser surface 56, which may in turn be physically attached to bell mouth surface 52. Accordingly, continuous ring 94 may further be characterized as having a continuous cross section, which may have a plurality of cross sectional dimensions. The plurality of cross sectional dimensions may include one or more of a first cross sectional dimension 50 which may be disposed parallel to central axis 46, and one or more of a second cross sectional dimension 96 which may be disposed orthogonal to central axis 46. The plurality of cross sectional dimensions may further include one or more of a third cross sectional dimension 126, one of more of a fourth cross sectional dimension 128, and the like. Each of the cross sectional dimensions may be disposed at an angle to central axis 46 (e.g., fourth cross sectional dimension 128 is shown disposed at angle 130 to central axis 46).

Figure 4B:
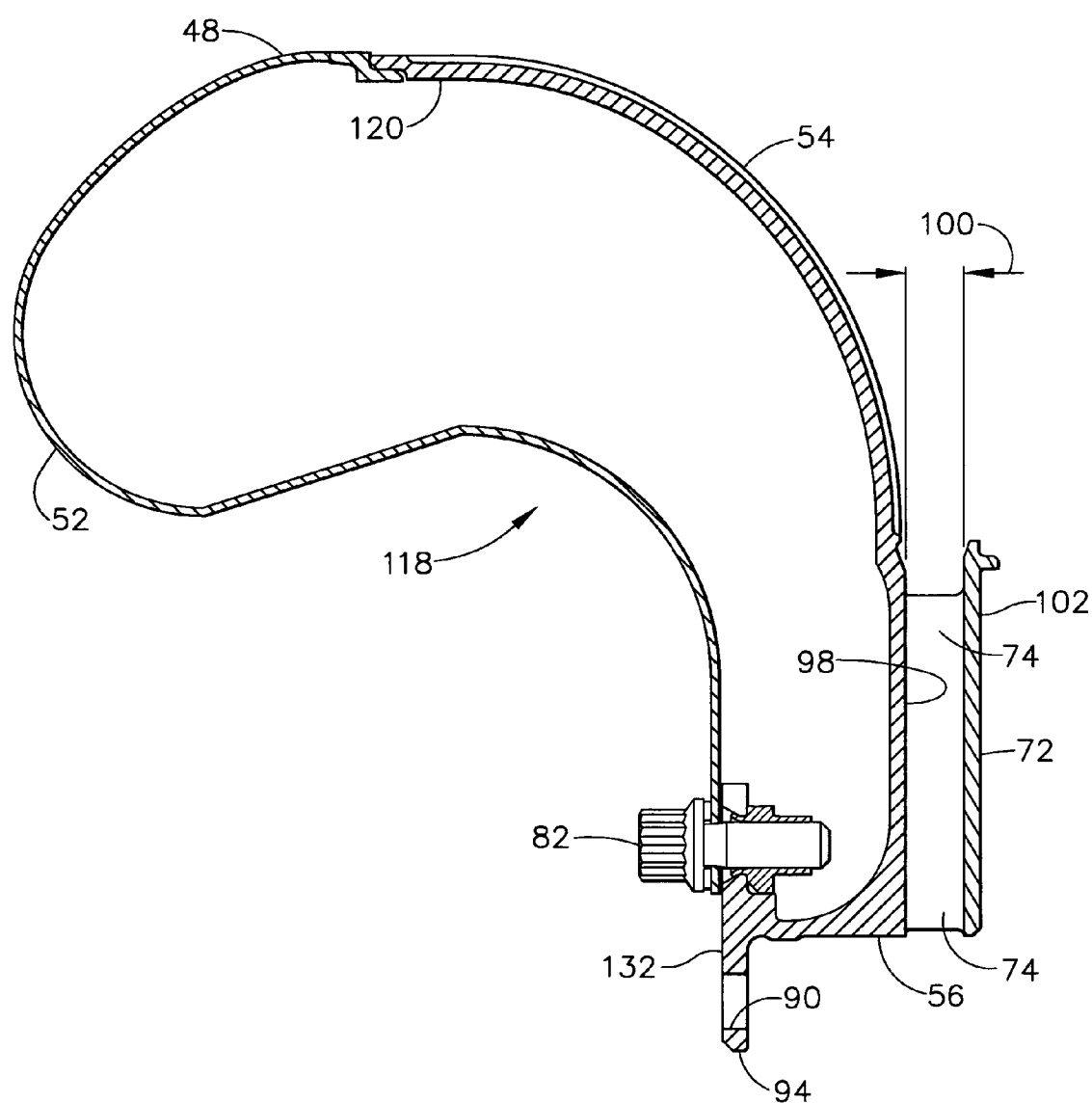
FIG. 4B is a sectional view of the integral assembly of FIG. 4A as taken along the line 4B—4B of FIG. 4A.

Integral assembly 44 may also include a compressor shroud 72, which may be physically attached to one or more vanes 74 extending longitudinally away from diffuser surface 56 in a direction parallel to central axis 46. As shown in FIG. 4B, which depicts a sectional view taken along the lines 4B—4B of FIG. 4A, a portion of diffuser surface 56 may have a diffuser face 98 which may be radially disposed about central axis 46 (see FIG. 4A). Diffuser face 98 may be perpendicular to central axis 46 (see, e.g., FIGS. 2–3, 4A, and 5). Diffuser face 98 may include a plurality of vanes 74 which may extend from diffuser face 98 in the direction of central axis 46. Each vane 74 may have a throat B-width 100. At least one of vanes 74 may have a top surface 102 which may be parallel to diffuser face 98. Compressor shroud 72 may be physically attached to top surface 102 of at least one of vanes 74. In another embodiment, compressor shroud 72 may be disposed parallel to diffuser face 98 of diffuser surface 56.

Bell mouth surface 52 may also include curved scalloped portion 118, (see also FIG. 3) which may be positioned between diffuser surface 56 and impeller surface 54, and below a first mechanical fastener 82. Curved scalloped portion 118 may have a concave shape relative to the plane 124 of inlet 70 (See FIG. 3) and may intercept a portion of air (not shown) entering inlet 70.

Figure 5A:
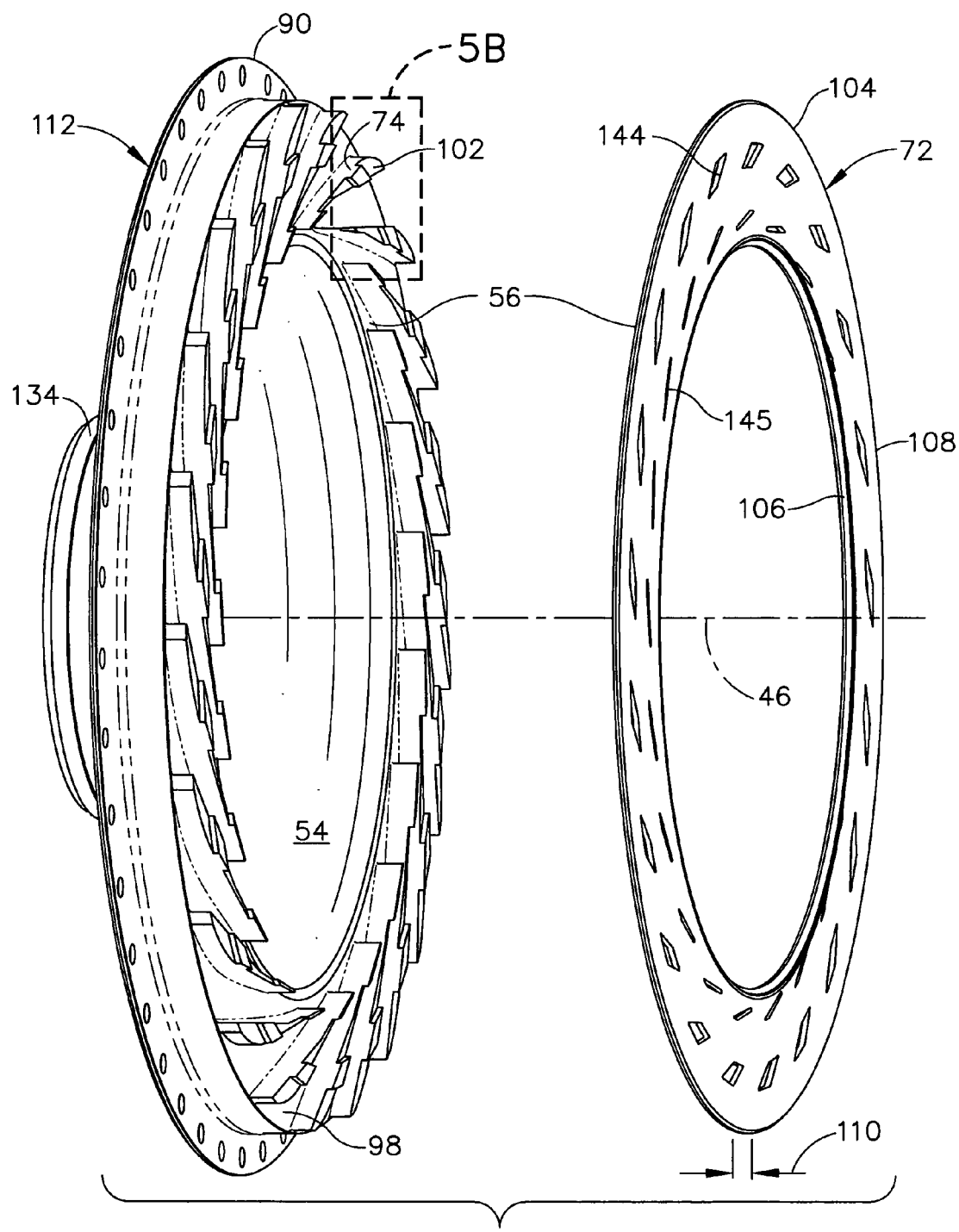
FIG. 5A is a rear perspective exploded view of a first sub-assembly of the present invention and the compressor shroud shown in FIG. 4A.

FIG. 5A shows an exploded view of a first sub-assembly 112, which may include compressor shroud surface 54, diffuser surface 56, and compressor shroud 72, as shown in FIGS. 4A and 4B (only one of vanes 74 being labeled for the sake of clarity). In one embodiment of the present invention, compressor shroud 72 may comprise a compressor shroud ring 104 having a first side 106 separated from a second side 108. Another features such as compressor shroud inner slots 145 and compressor shroud outer slots 144 may be used for improving a weldment or brazing process integrity which may improve indexing and/or surface contact. Accordingly, compressor shroud ring 104 may have a thickness 110.

Figure 5B:
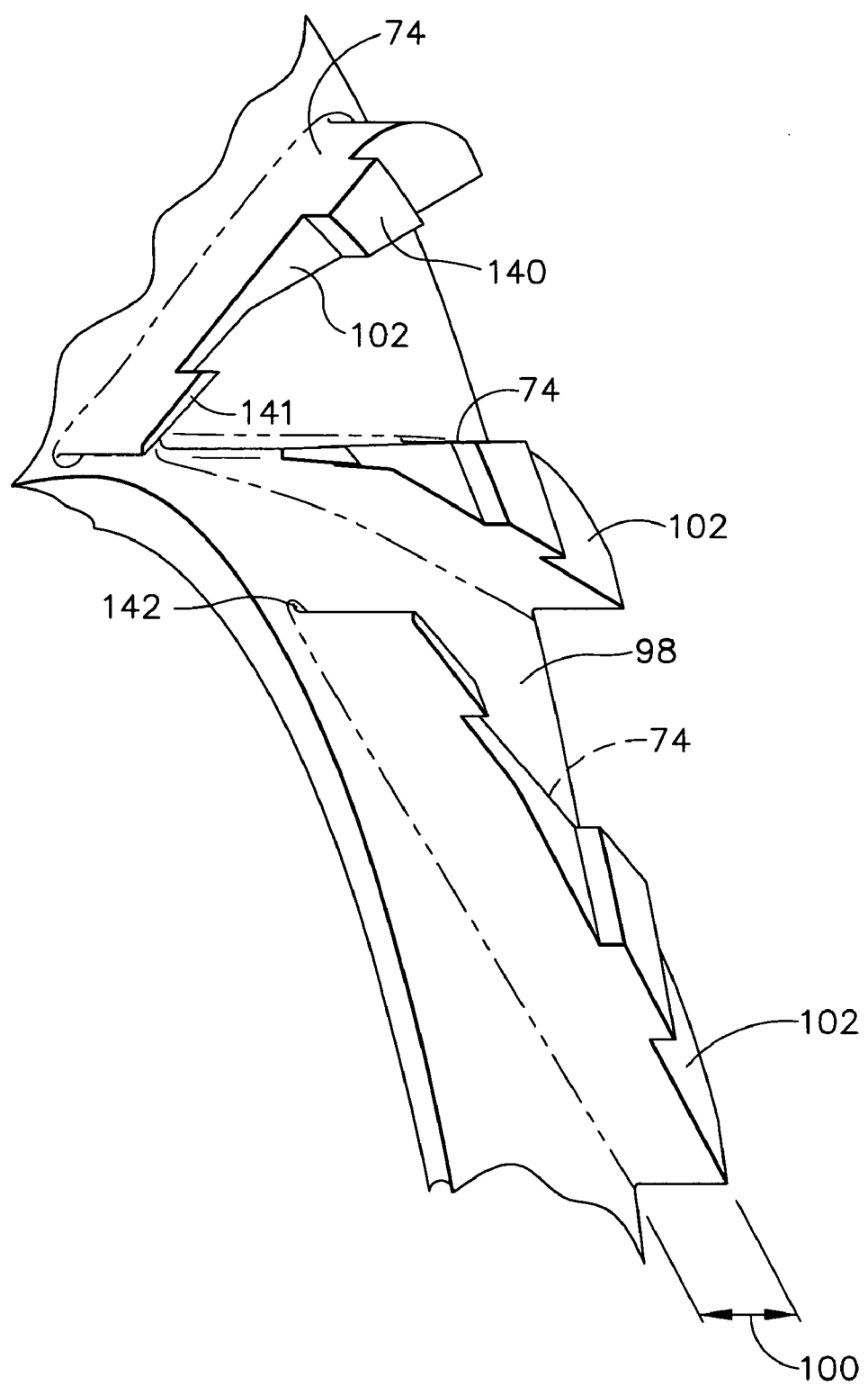
FIG. 5B is an enlarged view of portion 5B of the first sub-assembly shown in FIG. 5A.

FIG. 5B shows an enlarged portion 5B of FIG. 5A, wherein vanes 74 are shown extending throat B-width 100 away from diffuser face 98. Vanes 74 may also include top surface 102, which may be parallel to diffuser face 98. A plurality of outer blocks 140 and inner blocks 141 may be used for controlling B-width 100 which may enhance the welding and brazing process of compressor shroud ring 104.

Accordingly, an advantage provided by machining vane 74 to a compressor shroud surface 54 to maximize a flowing area on the higher momentum side with a minimal machining radius 142 may further improve the compressor performance.

Figure 6:
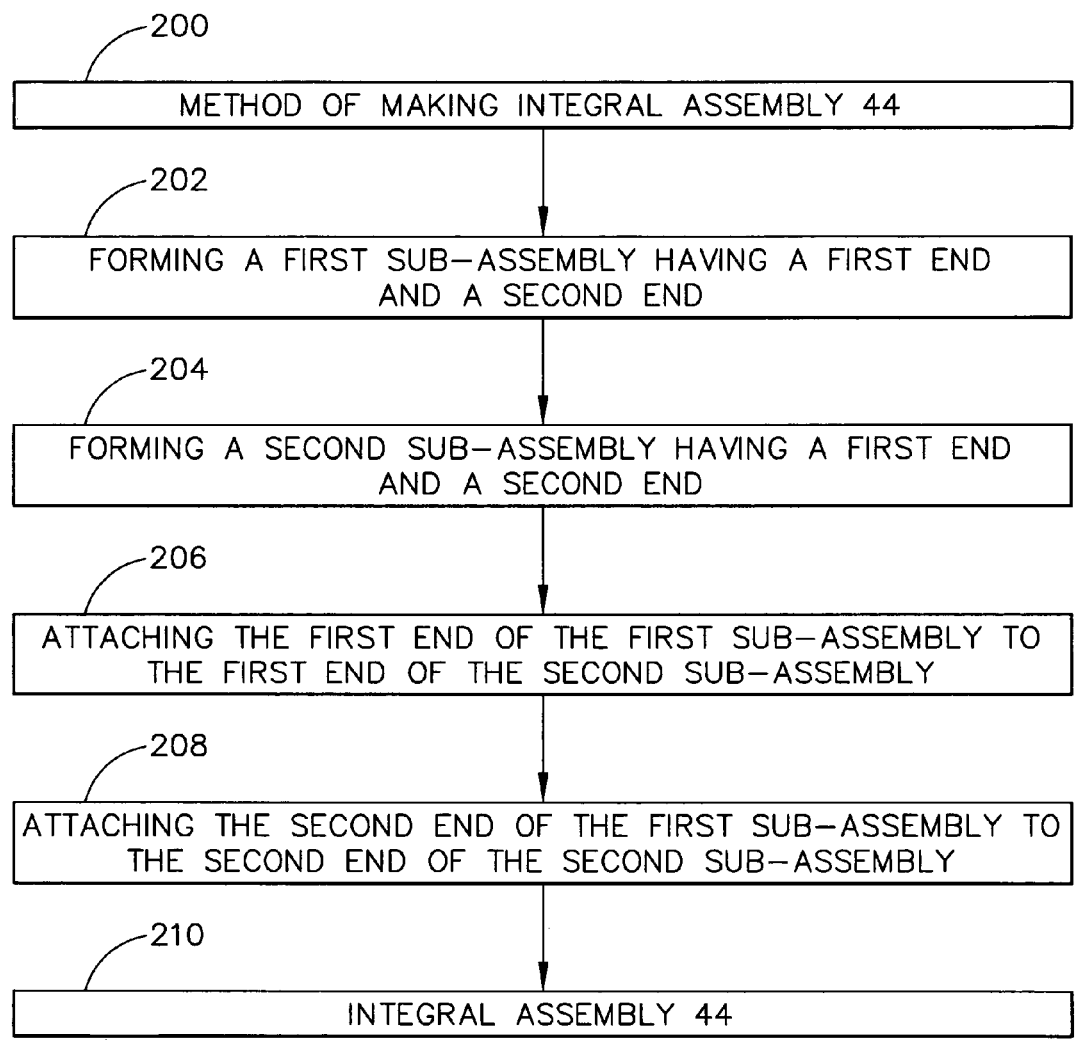
FIG. 6 shows the steps of a method of making an embodiment of an integral assembly of the present invention.

FIG. 6 shows a flow diagram of the steps of a method 200 to produce integral assembly 44 of the present invention. Method 200 may include a Step 202 of forming a first sub-assembly having a first end and a second end. In one embodiment, Step 202 may comprise forming first sub-assembly 112, which may comprise a combined compressor shroud surface 54 and diffuser surface 56, (see FIG. 5A). Method 200 may further include a Step 204 of forming a second sub-assembly (not shown) having a first end and a second end, which may include bell mouth surface 52. Bell mouth surface 52 may minimize local thermal distortion on compressor shroud surface 54 by isolating the difference at inlet air 70 from impinging directly on compressor shroud surface 54. Also, the cavity created between bell mouth surface 52 and compressor shroud surface 54 may slow down a thermal effect between compressor shroud surface 54 and compressor wheel 66. Together with bell mouth surface inner slots 143 may also allow pressure and thermal communication thus provide synchronization between a thermal reaction, optimize clearance control between the static and rotating structures and therefore improve compressor performance. Method 200 may further include a Step 206, comprising attaching the first end of the first sub-assembly to the first end of the second sub assembly. Method 200 may still further include a Step 208, comprising attaching the second end of the first sub-assembly to the second end of the second sub assembly, to produce the integral assembly 44 (Step 210).

In one embodiment, Step 202 may also include forming first sub-assembly 112 from a single piece of material 134, e.g., a single plate, wherein plurality of vanes 74 of diffuser surface 56 may be machined directly from a single piece of material 134 which includes diffuser face 98 (see FIG. 5A), e.g., located on a first side of a single plate. In another embodiment, Step 202 may include forming compressor shroud 72, which may, in an embodiment, be stamped or otherwise formed from a sheet of metal (not shown) and subsequently attached to top surface 102 of one or more vanes 74 of first sub-assembly 112 by welding, brazing, pressure fitting, or the like.

In one embodiment, integral assembly 44 of the present invention may be produced according to method 200 by machining first sub-assembly 112 in Step 202, wherein diffuser surface 56 comprises a diffuser face 98 having a plurality of vanes 74 extending longitudinally away from diffuser face 98 in a direction of central axis 46, and wherein diffuser face 98 and vanes 74 are machined into a single piece of material 134 to produce first sub-assembly 112.

In an embodiment, integral assembly 44 of the present invention may be produced according to method 200 by machining first sub-assembly 112 in Step 202 as a single unit such that an integral compressor shroud surface 54 and a diffuser surface 56 may be produced having an optimum continuity of a flow-path (not shown) between compressor wheel 66 and diffuser surface 56 (see, e.g., FIG. 3). Further, first sub-assembly may be produced in Step 202 by machining the first sub-assembly 112 in a single step. By machining first sub-assembly 112 as a single unit in Step 202, a method (e.g., method 200 of FIG. 6) may produce integral assembly 44 of the present invention that may allow for improved control over radial and axial gaps between a trailing edge 114 of compressor wheel 66 and a leading edge 116 of diffuser surface 56, which are in fluid communication with each other (see FIG. 3). In so doing, method 200 may thus minimize mechanical modal response (wake) during operation of compressor module 42 (see FIGS. 2 & 3). Furthermore, a joggle 134 may be included as a buffer zone which may dampen the wake. The air leakage or re-circulation from multiple mating surfaces in radial and axial directions between components (see, for example, leak path 26 of FIG. 1) may also be minimized by producing integral assembly 44 by attaching first sub-assembly 112 to a second sub-assembly (not shown) according to Steps 206 and 208 of method 200.

Step 202 of method 200 may further comprise forming a compressor shroud 72; and attaching compressor shroud 72 to one or more of vanes 74 disposed on diffuser surface 56, wherein compressor shroud 72 comprises a compressor shroud ring 104 having a first side 106 and a second side 108, and first side 106 of compressor shroud ring 104 may be in physical communication with one or more of vanes 74.

Step 206, wherein the first side of first sub assembly 112 and the first side of the second sub assembly (not shown) may be affixed to each other, may include using various types of attaching means (e.g., mechanical fasteners, welding, brazing, pressure fitting, and the like), as described above. Likewise, Step 208, wherein the second side of first sub assembly 112 and the second side of the second sub assembly (not shown) may be affixed to each other, may include using various types of attaching means (e.g., mechanical fasteners, welding, brazing, pressure fitting, and the like), also as described above.

In one embodiment of method 200, the first end of the first sub-assembly may be located adjacent to diffuser surface 56, and the second end of the first sub-assembly may be located opposite diffuser surface 56 and adjacent to compressor shroud surface 54 of first sub-assembly 112. In another embodiment, the first end of first sub-assembly 112 may be attached to the first end of the second sub-assembly (not shown) using a first mechanical fastener 82 (see FIG. 3).

Step 206 may include attaching the second end of first sub-assembly 112 to the second end of the second sub-assembly (not shown) using a lap joint (e.g., see lap joint 76 of FIG. 3). In another embodiment, lap joint 76 may also be welded or brazed.

It should be understood, of course, that the foregoing relates to exemplary embodiments of the invention and that modifications may be made without departing from the spirit and scope of the invention as set forth in the following claims.

We claim:

1. An integral assembly, comprising:
   a continuous ring disposed coaxial with, and orthogonal to a central axis,
   said continuous ring comprising a plurality of surfaces,
   said plurality of surfaces having a continuous outer surface and a continuous inner surface;
   said plurality of surfaces being characterized by a continuous cross section that includes a plurality of cross sectional dimensions including a first cross sectional dimension longitudinally disposed parallel to said central axis, and a second cross sectional dimension disposed orthogonal to said central axis,
   said plurality of surfaces comprising a bell mouth surface in physical communication with a compressor shroud surface,
   said compressor shroud surface being in physical communication with a diffuser surface, and said diffuser surface being in physical communication with said bell mouth surface.

2. The integral assembly of claim 1, wherein said bell mouth surface is physically attached to said compressor shroud surface.

3. The integral assembly of claim 2, wherein said bell mouth surface is physically attached to said compressor shroud surface through a lap joint.

4. The integral assembly of claim 1, wherein said compressor shroud surface is physically attached to said diffuser surface.

5. The integral assembly of claim 4, wherein said compressor shroud surface and said diffuser surface are a single piece of material.

6. The integral assembly of claim 1, wherein said diffuser surface is physically attached to said bell mouth surface.

7. The integral assembly of claim 6, wherein said diffuser surface is physically attached to said bell mouth surface using a first mechanical fastener.

8. The integral assembly of claim 1, wherein said bell mouth surface comprises a curved scalloped shaped portion arranged between a first mechanical fastener and said compressor shroud surface.

9. An integral assembly comprising:
a continuous ring disposed coaxial with, and orthogonal to a central axis;
said continuous ring comprising a plurality of contiguous surfaces;
said plurality of contiguous surfaces having a continuous outer surface and a continuous inner surface characterized by a continuous cross-section having a plurality of cross sectional dimensions including a first cross sectional dimension that is longitudinally disposed parallel to said central axis and a second cross sectional dimension disposed orthogonal to said central axis,
said plurality of contiguous surfaces comprising a bell mouth surface in physical communication with a compressor shroud surface,
said compressor shroud surface in physical communication with a diffuser surface;
said diffuser surface in physical communication with said bell mouth surface;
said diffuser surface having a diffuser face on a portion of said continuous outer surface radially disposed about said central axis;
said diffuser face being perpendicular to said central axis;
said diffuser face comprising a plurality of vanes extending longitudinally away from said diffuser face in a direction of said central axis;
said integral assembly further including a compressor shroud comprising a compressor shroud ring having a first side separated from a second side; and
said first side of said compressor shroud ring being in physical communication with one or more of said vanes.

10. The integral assembly of claim 9, wherein at least one of said vanes includes a top surface that is parallel to said diffuser face, and wherein said first side of said compressor shroud is in physical communication with said top surface, such that said first side is arranged parallel to said diffuser face.

11. The integral assembly of claim 10, wherein a plurality of said vanes each include said top surface that is parallel to said diffuser face, and wherein said first side of said compressor shroud is physically attached to each of said plurality of top surfaces.

12. The integral assembly of claim 9, wherein
said diffuser face and said compressor shroud form a first sub-assembly, said first sub-assembly adapted for attachment to a second sub assembly, said second sub assembly comprising said bell mouth surface.

13. The integral assembly of claim 9, wherein said continuous ring includes a plurality of mounting holes arranged annularly at an outer portion of said continuous ring, said continuous ring comprising a plurality of contiguous surfaces.

14. An integral assembly, comprising:
a continuous ring disposed coaxial with, and orthogonal to a central axis;
said continuous ring comprising a plurality of contiguous surfaces;
said continuous ring having a plurality of mounting holes arranged annularly at an outer portion of said continuous ring;
said plurality of contiguous surfaces having a continuous outer surface characterized by a continuous cross-section longitudinally disposed parallel to said central axis;
said plurality of contiguous surfaces comprising a bell mouth surface in physical communication with a compressor shroud surface,
said compressor shroud surface in physical communication with a diffuser surface;
said diffuser surface in physical communication with said bell mouth surface;
said bell mouth surface comprising a curved scalloped shaped portion arranged between said diffuser surface and said compressor shroud surface;
said diffuser surface having a diffuser face on a portion of said continuous outer surface radially disposed about said central axis;
said diffuser face being perpendicular to said central axis;
said diffuser face comprising a plurality of vanes extending longitudinally away from said diffuser face in a direction of said central axis;
said plurality of vanes each including a top surface that is parallel to said diffuser face,
said integral assembly further including a compressor shroud comprising a compressor shroud ring having a first side separated from a second side; and
said first side of said compressor shroud ring being in physical communication with each of said top surfaces of said plurality of vanes such that said first side of said compressor shroud ring is arranged parallel to said diffuser face.

15. An auxiliary power unit, comprising:
a compressor module;
said compressor module comprising an inlet in fluid communication with a bell mouth surface and with a compressor wheel;
said compressor wheel being able to rotate, about a central axis, between a compressor housing and a compressor shroud surface;
said compressor wheel having a trailing edge in fluid communication with a leading edge of a diffuser surface;
wherein said bell mouth surface, said compressor shroud surface, and said diffuser surface comprise an integral assembly;
said integral assembly comprising: a continuous ring disposed coaxial with, and orthogonal to said central axis;

said continuous ring comprising a plurality of surfaces;

said plurality of surfaces having a continuous outer surface and a continuous inner surface being characterized by a continuous cross section having a plurality of cross sectional dimensions including a first cross sectional dimension that is longitudinally disposed parallel to said central axis and a second cross sectional dimension disposed orthogonal to said central axis;

said plurality of surfaces comprising said bell mouth surface in physical communication with said compressor shroud surface;

said compressor shroud surface being in physical communication with said diffuser surface; and said diffuser sin-face being in physical communication with said bell mouth surface.

16. The auxiliary power unit of claim 15, wherein said diffuser surface includes a diffuser face on a portion of said continuous outer surface radially disposed about said central axis;

said diffuser face being perpendicular to said central axis;

said diffuser face comprising a plurality of vanes extending longitudinally away from said diffuser face in a direction of said central axis;

said auxiliary power unit further including a compressor shroud comprising a compressor shroud ring having a first side separated from a second side; and said first side of said compressor shroud ring being in physical communication with one or more of said vanes.

17. An aircraft comprising the auxiliary power unit of claim 16.

18. A method of making an integral assembly, comprising the steps of:

forming a first sub-assembly having a first end and a second end;

forming a second sub-assembly having a first end and a second end;

attaching said first end of said first sub-assembly to said first end of said second sub assembly; and attaching said second end of said first sub-assembly to said second end of said second sub-assembly, to produce said integral assembly, wherein said integral assembly comprises:

a continuous ring disposed coaxial with, and orthogonal to a central axis;

said continuous ring comprising a plurality of surfaces;

said plurality of surfaces having a continuous outer surface and a continuous inner surface;

said plurality of surfaces being characterized by a continuous cross section having a plurality of cross sectional dimensions including a first cross sectional dimension that is longitudinally disposed parallel to said central axis and a second cross sectional dimension disposed orthogonal to said central axis;

said plurality of surfaces comprising a bell mouth surface in physical communication with a compressor shroud surface, said compressor shroud surface being in physical communication with a diffuser surface; and said diffuser surface being in physical communication with said bell mouth surface.

19. The method of claim 18, wherein said first sub-assembly is machined from a single piece of material.

20. The method of claim 19, wherein said diffuser surface comprises a diffuser face having a plurality of vanes extending longitudinally away from said diffuser face in a direction of said central axis; and said diffuser face and said vanes being machined into said single piece of material to produce said first sub-assembly.

21. The method of claim 20, further comprising the steps of forming a compressor shroud; and attaching a compressor shroud to one or more of said vanes disposed on said diffuser surface;

said compressor shroud comprising:

a compressor shroud ring having a first side and a second side; and said first side of said compressor shroud ring being in physical communication with one or more of said vanes.

22. The method of claim 18, wherein said first end of said first sub-assembly is located adjacent to said diffuser surface, and said second end of said first sub-assembly is located opposite said diffuser surface and adjacent to said compressor shroud surface; and said first end of said first sub-assembly being attached to said first end of said second sub-assembly using a first mechanical fastener.

23. The method of claim 22, wherein said second end of said first sub-assembly is attached to said second end of said second sub-assembly using a lap joint.

24. The method of claim 23, wherein said lap joint is welded or brazed.

* * * * *

UNITED STATES PATENT AND TRADEMARK OFFICE
CERTIFICATE OF CORRECTION

PATENT NO. : 7,094,024 B2 Page 1 of 1
APPLICATION NO. : 10/759928
DATED : August 22, 2006
INVENTOR(S) : Nguyen et al.

It is certified that error appears in the above-identified patent and that said Letters Patent is hereby corrected as shown below:

Column 13, line 14, "sin-face" should be changed to --surface--.

Signed and Sealed this

Twenty-seventh Day of March, 2007

JON W. DUDAS
*Director of the United States Patent and Trademark Office*